United States Patent
Kumar et al.

(10) Patent No.: US 12,462,325 B2
(45) Date of Patent: Nov. 4, 2025

(54) METHOD AND SYSTEM FOR CONVERTING A PROTEIN DATA BANK FILE INTO A GRAYSCALE IMAGE ARRAY

(71) Applicant: Innoplexus AG, Eschborn (DE)

(72) Inventors: Sudhanshu Kumar, Bokaro (IN); Joel Joseph, Palayi (IN); Ansh Gupta, Menhdawal (IN)

(73) Assignee: Innoplexus AG, Eschborn (DE)

( * ) Notice: Subject to any disclaimer, the term of this patent is extended or adjusted under 35 U.S.C. 154(b) by 407 days.

(21) Appl. No.: 18/148,854

(22) Filed: Dec. 30, 2022

(65) Prior Publication Data
US 2024/0221109 A1    Jul. 4, 2024

(51) Int. Cl.
*G06T 1/20* (2006.01)
*G06T 9/00* (2006.01)
*G06T 11/00* (2006.01)

(52) U.S. Cl.
CPC .................. *G06T 1/20* (2013.01); *G06T 9/00* (2013.01); *G06T 11/00* (2013.01)

(58) Field of Classification Search
CPC .............. G06T 1/20; G06T 9/00; G06T 11/00
See application file for complete search history.

(56) References Cited

U.S. PATENT DOCUMENTS

2020/0174789 A1*  6/2020  Miller .................. G06F 9/30036

OTHER PUBLICATIONS

Raschka, Sebastian, published "Working with PDB Structures in DataFrames". Downloaded on Dec. 29, 2022 from url: http://rasbt.github.io/biopandas/tutorials/Working_with_PDB_Structures_in_DataFrames/#working-with-pdb-dataframes.

Barthelme, Simon, published "as.cimg.data.frame: Create an image from a data.frame". Downloaded on Dec. 29, 2022 from url: https://rdrr.io/cran/imager/man/as.cimg.data.frame.html.

Sentdex, published "Handling Non-Numerical Data for Machine Learning". Downloaded on Dec. 29, 2022 from url: https://pythonprogramming.net/working-with-non-numerical-data-machine-learning-tutorial/.

* cited by examiner

*Primary Examiner* — Christopher Wait

(57) ABSTRACT

A system and a method for converting protein data bank (PDB) files into a grayscale image array is provided. The method includes extracting PDB files from a PDB, using a data extraction module. The method also includes converting, using a file conversion module, the PDB files into a data frame based on BioPandas. The method further includes selecting, using a column selection module, one or more columns from the data frame based on a pre-determined criteria. The method furthermore includes converting, using a column conversion module, the selected one or more columns into a NumPy array for rendering the data frame to resemble an image. The method furthermore includes resizing the NumPy array using an OpenCV for making size of the NumPy array uniform and for generating a grayscale image array.

9 Claims, 8 Drawing Sheets

```
ATOM   1452  N    GLY A 190      53.810  39.145 117.785  1.00 59.13           N
ATOM   1453  CA   GLY A 190      53.202  40.446 117.540  1.00 65.04           C
ATOM   1454  C    GLY A 190      52.839  40.522 116.555  1.00 68.94           C
ATOM   1455  O    GLY A 190      51.751  39.567 115.817  1.00 67.82           O
ATOM   1456  N    PHE A 191      51.419  41.789 116.523  1.00 73.59           N
ATOM   1457  CA   PHE A 191      50.262  42.052 115.678  1.00 76.84           C
ATOM   1458  C    PHE A 191      49.167  40.996 115.625  1.00 77.59           C
ATOM   1459  O    PHE A 191      48.118  41.161 116.247  1.00 78.43           O
ATOM   1460  CB   PHE A 191      50.686  42.468 114.259  1.00 79.09           C
ATOM   1461  CG   PHE A 191      51.598  41.475 113.589  1.00 82.72           C
ATOM   1462  CD1  PHE A 191      51.077  40.421 112.841  1.00 83.95           C
ATOM   1463  CD2  PHE A 191      52.984  41.596 113.712  1.00 84.82           C
ATOM   1464  CE1  PHE A 191      51.927  39.404 112.222  1.00 85.28           C
ATOM   1465  CE2  PHE A 191      53.839  40.601 113.101  1.00 85.39           C
ATOM   1466  CZ   PHE A 191      53.309  39.628 112.351  1.00 85.38           C
TER    1467       PHE A 191
ATOM   1468  N    PRO B 233      43.457  42.314 161.412  1.00 66.82           N
ATOM   1469  CA   PRO B 233      43.958  42.453 160.024  1.00 66.05           C
ATOM   1470  C    PRO B 233      44.179  41.181 159.391  1.00 65.00           C
ATOM   1471  O    PRO B 233      44.238  40.008 160.075  1.00 65.72           O
ATOM   1472  CB   PRO B 233      45.264  43.225 160.093  1.00 65.81           C
ATOM   1473  CG   PRO B 233      45.022  44.070 161.325  1.00 66.64           C
ATOM   1474  CD   PRO B 233      44.270  43.147 162.314  1.00 66.95           C
ATOM   1475  N    LYS B 234      44.383  41.182 158.074  1.00 63.78           N
ATOM   1476  CA   LYS B 234      44.516  39.874 157.336  1.00 62.25           C
ATOM   1477  C    LYS B 234      44.865  40.278 155.897  1.00 59.77           C
ATOM   1478  O    LYS B 234      44.476  41.345 155.423  1.00 58.74           O
ATOM   1479  CB   LYS B 234      43.236  39.017 157.351  1.00 64.91           C
ATOM   1480  CG   LYS B 234      43.444  37.583 156.925  1.00 70.83           C
ATOM   1481  CD   LYS B 234      42.217  36.971 156.207  1.00 73.97           C
ATOM   1482  CE   LYS B 234      42.440  35.587 155.735  1.00 75.70           C
```

METHOD AND SYSTEM FOR CONVERTING A PROTEIN DATA BANK FILE INTO A GRAYSCALE IMAGE ARRAY

BACKGROUND

Technical Field

The present invention is generally related to the field of protein engineering. More particularly, the present invention is related to a method and system for converting a protein data bank file into a grayscale image array.

Description of the Related Art

Generally, protein engineering involves the development of proteins that have certain biological activities. Antibodies are proteins which are usually generated by the body of organisms to defeat foreign agents, usually other protein structures called Antigens. With the enhancement of biomolecule development in the laboratory setting, techniques have been developed to generate artificial antibodies that can deal with specific antigens and also measure their activity towards those antigens. Application of machine learning in antibody optimization has led to the requirement of easily processable numeric encodings or embeddings. Generating features from protein data bank (PDB) files has increasingly become one of the major goals of biotechnology and biomedicine over the past few decades. Typically, a PDB file is a docked structure of antibody-antigen compounds which could be visualized as a three-dimensional (3-D) structure. However, in PDB files, the data is present in a format that cannot be directly processed by artificial intelligence models, for a featurizer to efficiently featurize a PDB file to a set of numeric values. Additionally, given a PDB file, it is a tedious task to generate promising features consisting of only numbers without loss of much information.

Several existing techniques, such as Onionnet create features from PDB files using their a shell-based technique. They first calculate the distance between atoms of protein and ligand and then create imaginary shells of fixed radius around protein atoms and determine points of contact with the ligand atoms giving a binary value 0 or 1 for each contact. They create multiple shells of consecutively increasing sizes for generating the features. This technique is used only for PDBs of protein ligand complexes. Techniques such as Prodigy predict binding affinity values for protein-protein complexes from atomic structures. They compute a number of intermolecular contacts, no of charged-charged contacts, no of charged-polar contacts, no of charged-apolar contacts, no of polar-polar contacts, no of apolar-polar contacts, no of apolar-apolar contacts, percentage of apolar NIS residues and percentage of charged NIS residues from the PDB file. They then generate some weightages to these metrics by fitting the linear regression model and calculate the binding affinity using the above features. The above technique is not very robust as it uses very few features (only contact based features) and also uses a simple linear regression model which oversimplifies the problem by assuming linear relationship among features which leads to poor prediction in majority of cases. However, none of the known techniques have an efficient way of conversion of the PDB files into a format that can be directly processed by artificial intelligence models, for a featurizer to efficiently featurize a PDB file to a set of numeric values. Hence there is need for a method and a system for converting PDB file into grayscale image array.

The above-mentioned shortcomings, disadvantages and problems are addressed herein, and will be understood by reading and studying the following specification.

SUMMARY

This summary is provided to introduce a selection of concepts in a simplified form that are further disclosed in the detailed description. This summary is not intended to determine the scope of the claimed subject matter.

The embodiments herein address the above-recited needs for a system and a method for converting PDB file into a grayscale image array. The method and system of the present technology for generating the grayscale image array from the PDB files increases efficiency in binding affinity prediction and also enables faster development of drugs. Using the method and system of the present technology HER2 antibodies (Drugs) can be generated which are more effective at neutralizing the HER2 antigen.

According to one aspect, a processor implemented method of converting protein data bank (PDB) files into a grayscale image array is provided. The method includes extracting PDB files from a PDB, using a data extraction module. The method further includes converting, using a file conversion module, the PDB files into a data frame based on BioPandas. The method furthermore includes selecting, using a column selection module, one or more columns from the data frame based on a pre-determined criteria. The method furthermore includes converting, using a column conversion module, the selected one or more columns into a NumPy array for rendering the data frame to resemble an image. The method furthermore includes resizing, using an image array generation module, the NumPy array for making size of the NumPy array uniform and for generating a grayscale image array.

In an embodiment, selecting the one or more columns includes shortlisting one or more columns based on the pre-determined criteria and performing a one hot encoding of the non-numeric columns.

In an embodiment, converting the one or more columns into the NumPy array includes scaling each column between 0 to 255 and normalizing one or more columns of the data frame using min-max normalization for obtaining.

In an embodiment, the NumPy array is resized to a height of 100.

According to another aspect, a system for converting protein data bank (PDB) files into a grayscale image array is disclosed. The system includes a non-transitory memory configured to store PDB files and one or more executable modules and a processor configured to execute the one or more executable modules for converting protein data bank (PDB) files into a grayscale image array. The one or more executable modules includes a data extraction module configured to extract PDB files from a PDB. The one or more executable modules also includes a file conversion module configured to convert the PDB files into a data frame based on BioPandas. The one or more executable modules further includes a column selection module configured to select one or more columns from the data frame based on a pre-determined criteria. The one or more executable modules further includes an image array generation module for resizing the NumPy array for making size of the NumPy array uniform and for generating a grayscale image array.

In an embodiment, the column selection module is further configured to shortlist one or more columns based on the pre-determined criteria and perform a one hot encoding of the non-numeric columns.

In an embodiment, the file conversion module is further configured to scale each column between 0 to 255 and normalize one or more columns of the data frame using min-max normalization for obtaining. In an embodiment, the NumPy array is resized to a height of 100.

According to yet another aspect, one or more non-transitory computer readable storage mediums storing one or more sequences of instructions, which when executed by one or more processors, causes a method for converting protein data bank (PDB) files into a grayscale image array is disclosed. The method includes extracting PDB files from a PDB, using a data extraction module. The method further includes converting, using a file conversion module, the PDB files into a data frame based on BioPandas. The method furthermore includes selecting, using a column selection module, one or more columns from the data frame based on a pre-determined criteria. The method furthermore includes converting, using a column conversion module, the selected one or more columns into a NumPy array for rendering the data frame to resemble an image. The method furthermore includes resizing, using an image array generation module, the NumPy array for making the size of the NumPy array uniform and for generating a grayscale image array.

The method and system of the present technology provides an efficient technique for converting protein data bank (PDB) files into a grayscale image array that in turn reduces processing complexity and improves efficiency of processes the PDB files are subjected to in protein engineering such as featurization of PDB files. The present technology is extremely useful for the faster development of drugs such as HER2. Antibodies (Drugs) can be generated which are more effective at neutralizing the HER2 antigen. The present technology is also useful in other antibody optimization tasks in the bioinformatics domain. The present technology also converts PDB file into such a format which will contain more concise information that could be directly seen by machine learning models, thereby enabling more efficient featurization.

It is to be understood that the aspects and embodiments of the disclosure described above may be used in any combination with each other. Several of the aspects and embodiments may be combined to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

These and other objects and advantages will become more apparent when reference is made to the following description and accompanying drawings.

BRIEF DESCRIPTION OF THE DRAWINGS

The other objects, features and advantages will occur to those skilled in the art from the following description of the preferred embodiment and the accompanying drawings in which:

FIG. 2 depicts a sample PDB file that the BioPandas takes as input, in accordance with an exemplary scenario;

Figure 1:
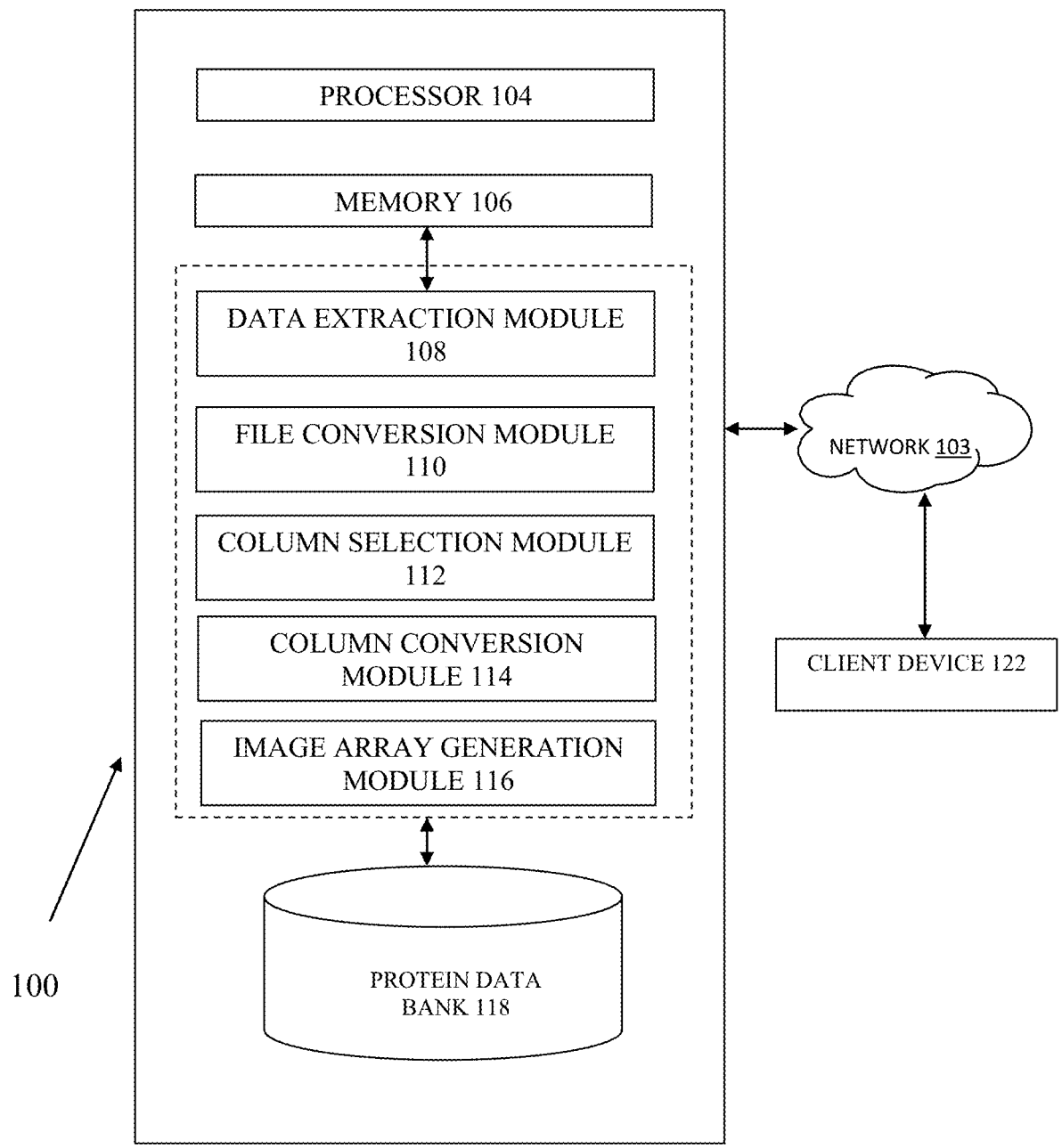
FIG. 1 depicts an architecture of an implementation of system for converting protein data bank (PDB) files into a grayscale image array, according to one or more embodiments.

Although the specific features of the embodiments herein are shown in some drawings and not in others. This is done for convenience only as each feature may be combined with any or all of the other features in accordance with the embodiments herein.

DETAILED DESCRIPTION OF THE DRAWINGS

The detailed description of various exemplary embodiments of the disclosure is described herein with reference to the accompanying drawings. It should be noted that the embodiments are described herein in such details as to clearly communicate the disclosure. However, the amount of details provided herein is not intended to limit the anticipated variations of embodiments; on the contrary, the intention is to cover all modifications, equivalents, and alternatives falling within the spirit and scope of the present disclosure as defined by the appended claims.

It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

While the disclosure is susceptible to various modifications and alternative forms, specific embodiment thereof has been shown by way of example in the drawings and will be described in detail below. It should be understood, however, that it is not intended to limit the disclosure to the forms disclosed, but on the contrary, the disclosure is to cover all modifications, equivalents, and alternatives falling within the scope of the disclosure.

The detailed description of various exemplary embodiments of the disclosure is described herein with reference to the accompanying drawings. It should be noted that the embodiments are described herein in such details as to clearly communicate the disclosure. However, the details provided herein is not intended to limit the anticipated variations of embodiments; on the contrary, the intention is to cover all modifications, equivalents, and alternatives falling within the spirit and scope of the present disclosure as defined by the appended claims.

It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

While the disclosure is susceptible to various modifications and alternative forms, specific embodiment thereof has been shown by way of example in the drawings and will be described in detail below. It should be understood however, it is not intended to limit the disclosure to the forms disclosed, but on the contrary, the disclosure is to cover all modifications, equivalents, and alternatives falling within the scope of the disclosure.

The various embodiments of the present technology provides an efficient technique for generating a grayscale image array from protein data bank files that could be fed into a machine learning model for a wide range of tasks. The present technology provides a method and system for converting protein data bank (PDB) files into a grayscale image array. In an embodiment, the method and system of the present technology can be used for conversion of the PDB files into in a format that can be directly processed by artificial intelligence models, for a featurizer to efficiently featurize a PDB file to a set of numeric values, that can be applied for various applications such as computation of a binding affinity between antibody and antigen molecules based on deep learning. Typically, the three-dimensional (3D) structure of protein-protein complexes is stored in PDB files. The PDB files stores the x, y, z coordinates of atoms in the molecule along with the chain name, and other information. The information in the PDB files cannot be directly fed into neural network/other artificial intelligence models and hence need to be converted into a usable format using different types of featurization techniques The present technology can be used for efficiently convert the PDB files into a format that can be easily processed in the featurizer to generate artificial intelligence models based on deep learning and to process and classify protein sequences of antigens and antibodies in the scale of more than 1 million sequences for computing the binding affinity of the protein sequences, the information associated with which can be later used for drug development and discovery applications.

Referring now to FIG. 1, FIG. 1 depicts an architecture of an implementation of system 100 for converting protein data bank (PDB) files into a grayscale image array, according to one or more embodiments. In an embodiment, the system 100 may be a part of a server and may include binding affinity prediction platform 102 and a network 103 for enabling communication between the system components for information exchange. The network 103 may be for example, a private network and a public network, a wired network or a wireless network. The wired network may include, for example Digital Subscriber Line (DSL), coaxial cable lines, or optical fiber lines. The wireless network may include for example Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, a satellite band and other similar wireless networks. The wireless networks may also include any cellular network standards to communicate among mobile devices. The system 100 may be accessible to a client device 122 via the network 103. Examples of the client device 122 includes but is not limited to user devices (such as cellular phones, personal digital assistants (PDAs), handheld devices, laptop computers, personal computers, an Internet-of-Things (IOT) device, a smart phone, a machine type communication (MTC) device, a computing device, a drone, or any other portable or non-portable electronic device.

According to some embodiments, the system 100 may be implemented in a variety of computing systems, such as a mainframe computer, a server, a network server, a laptop computer, a desktop computer, a notebook, a workstation, and the like. In an implementation, the system 100 may be implemented in a server or in a computing device. In some embodiments, the system 100 may be implemented as a part of a cluster of servers. In some embodiments, the system 100 may be performed by the plurality of servers. These tasks may be allocated among the cluster of servers by an application, a service, a daemon, a routine, or other executable logic for task allocation.

In one or more embodiments, the system 100 is configured to convert protein data bank (PDB) files into a grayscale image array. As used herein the term "gray scale image array" refers to representation of a single grayscale image using a two-dimensional (2D) NumPy array or a tensor. Since there is only one channel in a grayscale image, we do not need an extra dimension to represent the color channel. The two dimensions represent the height and width of the image.

According to some embodiments, system 100 may include a processor 104 and a memory 106. In an embodiment, the memory 106 may include a non-transitory memory configured to store a protein sequence data set and one or more executable modules. The processor 104 may be configured to execute the one or more executable modules for converting the PDB files into a grayscale image array. In an embodiment, the one or more executable modules may include a data extraction module 108, a file conversion module 110, a column selection module 112, a column conversion module 114, and an image array generation module 116. Further, system 100 may include a protein data bank (PDB) 118 storing data associated with all protein complexes, such as three-dimensional (3D) structure of the protein complexes, PDB index of the protein complexes, residue range, chain IDs, and the like.

According to some embodiments, the data extraction module 108 is configured to extract PDB files from a PDB. As used herein the term "PDB" stands for a database for a three-dimensional structural data of large biological molecules, such as proteins and nucleic acids. In the PDB data file format for macromolecular models, each atom is designated either ATOM or HETATM (which stands for hetero atom). ATOM is reserved for atoms in standard residues of protein, DNA or RNA. HETATM is applied to non-standard residues of protein, DNA or RNA, as well as atoms in other kinds of groups, such as carbohydrates, substrates, ligands, solvent, and metal ions.

According to some embodiments, the file conversion module 110 is configured to convert the PDB files into a data frame based on BioPandas. BioPandas is a python package for working with molecular structures in pandas data frames. The Biopandas changes the format of the PDB file to data frame, keeping all the contents unchanged in the same format as in the PDB file. In some other embodiments, the Arpeggio tool may be used for file conversion. The file conversion module 110 analyses the PDB files in a high-level, general-purpose programming language, such as python and works with molecular structures of biological macromolecules (from PDB files) in pandas data frames. According to some embodiments, the file conversion module 110 is further configured to scale each column between 0 to 255. Consider, for example, PDB files with the same number of columns and different number of rows. For making feature/featurization which is consistent we need to take those values to the matrix of number of their size. Since there can be different range of values, the file conversion module 110 normalizes the column. For every column the file conversion module 110 scales the values from 0 to 255. If the value is zero it is scaled to '0' and if the value is 255 it is scaled to '1'. And after scaling, some of the PDB files may have 100 rows, some may have 2000. For each PDB file, the number of rows may vary from 1000-4000. The file conversion module 110 normalizes one or more columns of the data frame using min-max normalization based on equation (1):

$$x\_norm = (x - x\_min)/(x\_max - x\_min) \quad (1)$$

where x_max=Maximum value present in the column, x_min=Minimum value present in the column, x is the entry for which we are calculating the normalized value x_norm.

According to some embodiments, the column selection module 112 is configured to select one or more columns from the data frame based on a pre-determined criteria. In an embodiment, the pre-determined criteria includes for example, removal of columns which contain the same value throughout the column and empty columns which are containing NaN values and removal of the columns which are used in indexing the rows or a particular amino acid pair binding. This step is done for cleaning the data. Consider for example, if there are some columns that record only one item, such as one atom. It will not be possible to learn anything from such a column. So the columns are empty. The column selection module 112 shortlists such columns like chain occupancy, symbol atoms, and the like based on the items in the column and whether the column is useful for learning or featurization at a later stage or not. The column selection module 112 performs a one hot encoding of the non-numeric columns.

According to some embodiments, the column conversion module 114 converts the selected one or more columns into a NumPy array for rendering the data frame to resemble an image. After shortlisting the columns, by the column selection module 112, there may be some columns which have alphabets they are not numeric. A NumPy array is a grid of values, all of the same type, and indexed by a tuple of nonnegative integers. The number of dimensions is the rank of the array; the shape of an array is a tuple of integers giving the size of the array along each dimension. The column conversion module 114 converts such non-numeric columns to a one hot encoding vector to obtain a full numeric data in the form of NumPy array. The one hot encoding involves encoding of non-numeric data such as alphabets a, b, c into numeric values such as 100, 001, 010 respectively. The one hot encoding is simplest technique and consumes less processing time compared to other techniques.

According to some embodiments, the image array generation module 116 resizes the NumPy for making size of the NumPy array uniform and for generating a grayscale image array. For featurization of a PDB file in any machine learning model, PDB files of the same size are required. Therefore, the image array generation module 116 resizes the NumPy array to obtain the grayscale image array. In an embodiment, the image array generation module 116 resizes the NumPy array using a library of programming functions, such as, for example, OpenCV. According to an embodiment, the NumPy array is resized to a height of 100.

FIG. 2 depicts a sample PDB file 200 that the BioPandas takes as input, in accordance with an exemplary scenario. The PDB file is converted to data frame using BioPandas.

Figure 3:
FIG. 3 depicts a data frame generated from the PDB files using BioPandas, in accordance with an exemplary scenario.

FIG. 3 depicts a data frame 300 generated from the PDB files using BioPandas, in accordance with an exemplary scenario. The file conversion module 110 analyses the PDB files in a high-level, general-purpose programming language, such as python and works with molecular structures of biological macromolecules (from PDBfiles) in pandas data frames. According to some embodiments, the file conversion module 110 is further configured to scale each column between 0 to 255.

Figure 4:
FIG. 4 depicts columns shortlisted from the data frames, in accordance with an exemplary scenario.

FIG. 4 depicts columns shortlisted from the data frames, in accordance with an exemplary scenario. In the example scenario of FIG. 4, the columns which contain the same value throughout the column in the data frame 300 of FIG. 3 are removed to obtain the shortlisted columns 400 of FIG. 4. As can be observed from FIG. 4, also the empty columns which are containing NaN values are removed to obtain the shortlisted columns 400 of FIG. 4. Additionally, the columns which are used in indexing the rows or a particular amino acid pair binding are also removed. This preprocessing step is done for cleaning the data.

Figure 5:
FIG. 5 depicts an example data frame obtained after one hot encoding of non-numeric columns, in accordance with an exemplary scenario.

FIG. 5 depicts an example data frame 500 obtained after one hot encoding of non-numeric columns, in accordance with an exemplary scenario. As can be observed from data frame 500, the columns containing the names of amino acids which are binding, are one hot encoded those amino acid values to make it script friendly.

Figure 6:
FIG. 6 depicts a normalized data frame, in accordance with an exemplary scenario.

FIG. 6 depicts a normalized data frame 600, in accordance with an exemplary scenario. The file conversion module 110 normalizes one or more columns of the data frame using min-max normalization. As can be observed from the normalized data frame 600, each column is scaled between 0 and 255 and converted it into a NumPy array to make the data frame similar to an image.

Figure 7:
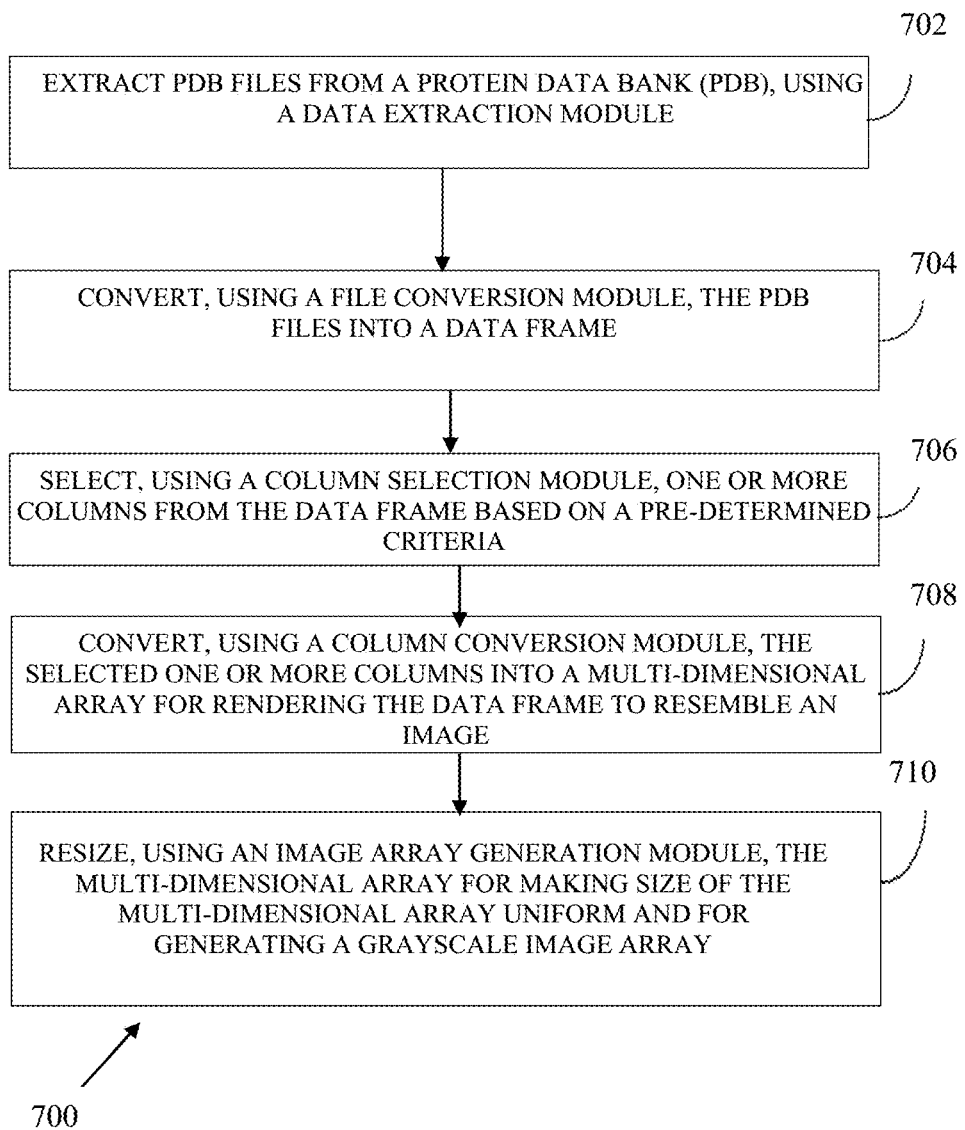
FIG. 7 illustrates a flow diagram depicting a method of converting protein data bank (PDB) files into a grayscale image array.

FIG. 7 illustrates a flow diagram 700 depicting a method of converting protein data bank (PDB) files into a grayscale image array. At step 702, the method includes extracting PDB files from a PDB, using a data extraction module. At step 704, using a file conversion module, the PDB files are converted into a data frame based on BioPandas. At step 706, using a column selection module, one or more columns are selected from the data frame based on a pre-determined criteria. In an embodiment, selecting includes shortlisting one or more columns based on the pre-determined criteria and performing a one hot encoding of the non-numeric columns. At step 708, using a column conversion module, the selected one or more columns are converted into a NumPy array for rendering the data frame to resemble an image. In an embodiment, converting includes scaling each column between 0 to 255 and normalizing one or more columns of the data frame using min-max normalization. At step 710, using an image array generation module, the NumPy array is resized for making size of the NumPy array uniform and for generating a grayscale image array. In an embodiment, the NumPy array is resized to a height of 100.

Figure 8:
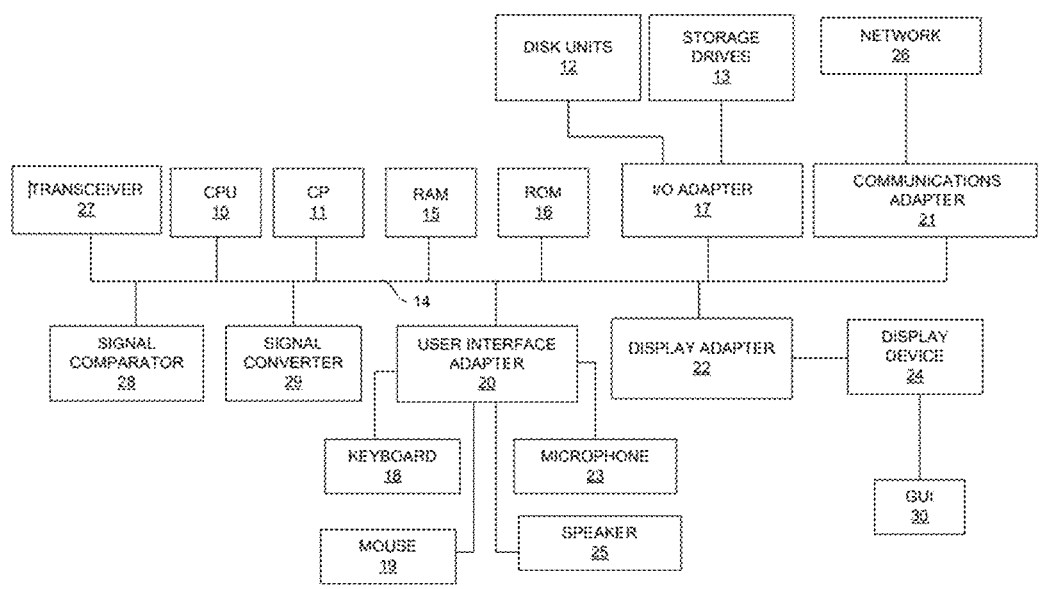
FIG. 8 is a computer system used in accordance with the embodiments herein.

A representative hardware environment for practicing the embodiments herein is depicted in FIG. 8 with reference to FIGS. 1 through 7. This schematic drawing illustrates a hardware configuration of system 100 of FIG. 1, in accordance with the embodiments herein. The hardware configuration includes at least one processing device 10 and a cryptographic processor 11. The computer system 104 may include one or more of a personal computer, a laptop, a tablet device, a smartphone, a mobile communication device, a personal digital assistant, or any other such computing device, in one example embodiment. The computer system 104 includes one or more processor (e.g., the processor 108) or central processing unit (CPU) 10. The CPUs 10 are interconnected via system bus 12 to various devices such as a memory 14, read-only memory (ROM) 16, and an input/output (I/O) adapter 18. Although CPUs 10 are depicted, it is to be understood that the computer system 104 may be implemented with only one CPU.

The I/O adapter 18 can connect to peripheral devices, such as disk units 11 and tape drives 13, or other program storage devices that are readable by the system. The computer system 104 can read the inventive instructions on the program storage devices and follow these instructions to execute the methodology of the embodiments herein. The computer system 104 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Various embodiments of the present technology provides an efficient technique for converting protein data bank (PDB) files into a grayscale image array that in turn reduces processing complexity and improves efficiency of processes the PDB files are subjected to in protein engineering such as featurization of PDB files. The present technology is extremely useful for the faster development of drugs such as HER2. Antibodies (Drugs) can be generated which are more effective at neutralizing the HER2 antigen. The present technology is also useful in other antibody optimization tasks in the bioinformatics domain.

The embodiments herein (more particularly the executable modules including for example, the data extraction module 108, the file conversion module 110, the column selection module 112, the column conversion module 114, and the image array generation module 116) can take the form of, an entirely hardware embodiment, an entirely software embodiment or an embodiment including both hardware and software elements. The embodiments that are implemented in software include but are not limited to, firmware, resident software, microcode, and the like. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The embodiments herein can include both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The system, method, computer program product, and propagated signal described in this application may, of course, be embodied in hardware; e.g., within or coupled to a Central Processing Unit ("CPU"), microprocessor, microcontroller, System on Chip ("SOC"), or any other programmable device. Additionally, the system, method, computer program product, and propagated signal may be embodied in software (e.g., computer readable code, program code, instructions and/or data disposed in any form, such as source, object or machine language) disposed, for example, in a computer usable (e.g., readable) medium configured to store the software. Such software enables the function, fabrication, modeling, simulation, description and/or testing of the apparatus and processes described herein.

Such software can be disposed in any known computer usable medium including semiconductor, magnetic disk, optical disc (e.g., CD-ROM, DVD-ROM, and the like) and as a computer data signal embodied in a computer usable (e.g., readable) transmission medium (e.g., carrier wave or any other medium including digital, optical, or analog-based medium). As such, the software can be transmitted over communication networks including the Internet and intranets. A system, method, computer program product, and propagated signal embodied in software may be included in a semiconductor intellectual property core (e.g., embodied in HDL) and transformed to hardware in the production of integrated circuits. Additionally, a system, method, computer program product, and propagated signal as described herein may be embodied as a combination of hardware and software A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real time," "offline," in a "batch mode," etc. Portions of processing can be performed at different times and at different locations, by different (or the same) processing systems.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims. The scope of the embodiments will be ascertained by the claims to be submitted at the time of filing a complete specification.

What is claimed is:

1. A processor-implemented method of converting protein data bank (PDB) files into a grayscale image array, the method comprising:
   extracting PDB files from a PDB, using a data extraction module;

converting, using a file conversion module, the PDB files into a data frame based on BioPandas;

selecting, using a column selection module, one or more columns from the data frame based on a pre-determined criteria;

converting, using a column conversion module, the selected one or more columns into a NumPy array for rendering the data frame to resemble an image; and resizing, using an image array generation module, the NumPy array for making size of the NumPy array uniform and for generating a grayscale image array.

2. The processor-implemented method of claim 1, wherein selecting the one or more columns comprises:

shortlisting one or more columns based on the pre-determined criteria; and performing a one hot encoding of the non-numeric columns.

3. The processor-implemented method of claim 1, wherein converting the one or more columns into the NumPy array comprises:

scaling each column between 0 to 255; and normalizing one or more columns of the data frame using min-max normalization for obtaining.

4. The processor-implemented method of claim 1, wherein the NumPy array is resized to a height of 100.

5. A system for converting protein data bank (PDB) files into a grayscale image array, the system comprising:

a non-transitory memory configured to store PDB files and one or more executable modules; and a processor configured to execute the one or more executable modules for converting protein data bank (PDB) files into a grayscale image array, wherein the one or more executable modules comprises:

a data extraction module configured to extracting PDB files from a PDB;

a file conversion module configured to convert the PDB files into a data frame based on BioPandas; and a column selection module configured to select one or more columns from the data frame based on a pre-determined criteria;

an image array generation module for resizing the NumPy array for making size of the NumPy array uniform and for generating a grayscale image array.

6. The system of claim 5, wherein the column selection module is further configured to:

shortlist one or more columns based on the pre-determined criteria; and perform a one hot encoding of the non-numeric columns.

7. The system of claim 5, wherein the file conversion module is further configured to:

scale each column between 0 to 255; and normalize one or more columns of the data frame using min-max normalization.

8. The system of claim 5, wherein the NumPy array is resized to a height of 100.

9. One or more non-transitory computer readable storage mediums storing one or more sequences of instructions, which when executed by one or more processors, causes a method for converting protein data bank (PDB) files into a grayscale image array, the method comprising:

extracting PDB files from a PDB, using a data extraction module;

converting, using a file conversion module, the PDB files into a data frame based on BioPandas;

selecting, using a column selection module, one or more columns from the data frame based on a pre-determined criteria;

converting, using a column conversion module, the selected one or more columns into a NumPy array for rendering the data frame to resemble an image;

resizing, using an image array generation module, the NumPy array for making size of the NumPy array uniform and for generating a grayscale image array.

* * * * *